(No Model.)

H. LACASSE.
LAWN MOWER.

No. 296,759. Patented Apr. 15, 1884.

Witnesses:
P. L. Sylvester
Joseph Smith

Inventor:
Henry Lacasse

UNITED STATES PATENT OFFICE.

HENRY LACASSE, OF AUBURN, NEW YORK.

LAWN-MOWER.

SPECIFICATION forming part of Letters Patent No. 296,759, dated April 15, 1884.

Application filed March 17, 1883. (No model.)

*To all whom it may concern:*

Be it known that I, HENRY LACASSE, of Auburn, in the county of Cayuga and State of New York, have invented a new and useful Improvement in Lawn-Mowers, of which the following is a description of its construction and operation.

My improvement relates chiefly to the gathering up and removing of the short cut grass, &c., from lawns as it is cut, or independent of the cutting process, as desired. I attain these objects by the mechanism illustrated in the accompanying drawings, in which—

Figure 1:
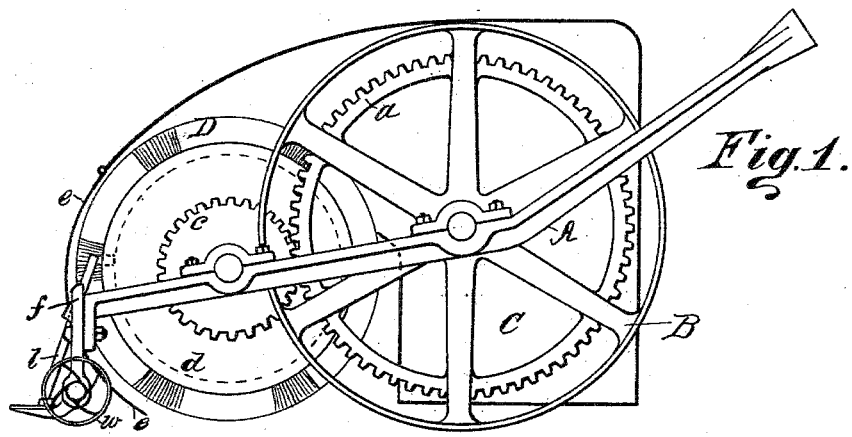
Figure 2:
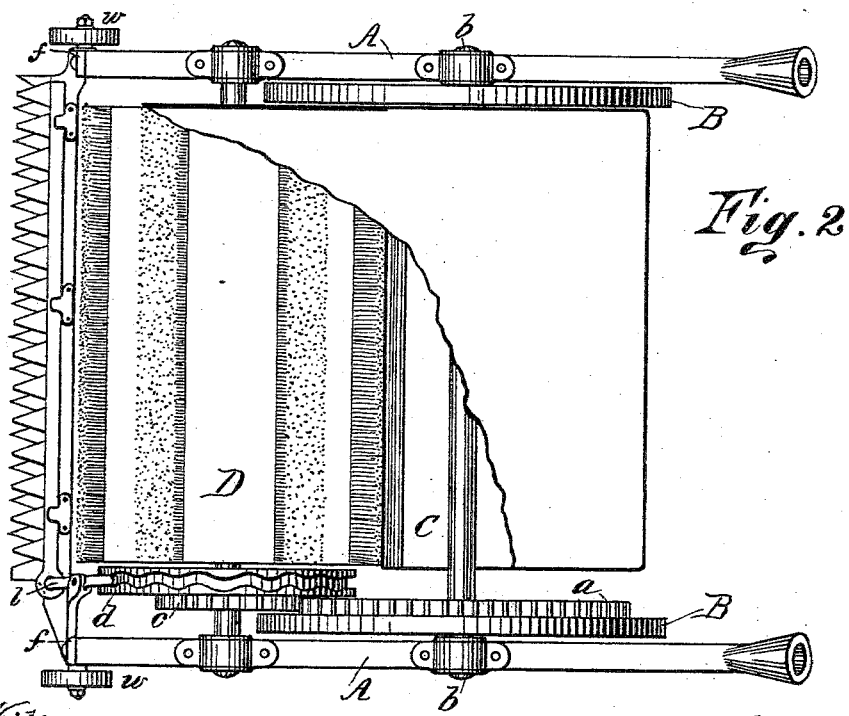

Figure 1 is a side elevation of the lawn-mower. Fig. 2 is a plan of the same with a portion of the cover or shield removed.

Like letters refer to the same parts in both figures.

The frame A is of proper construction to unite the moving parts in their relative positions, and may be for one or two handles, by which it is driven like an ordinary lawn-mower. This frame is mounted on two carrying or driving wheels, B, which support a box, C, that extends the whole width between the sides of the frame, and is suspended by the axle $b$, that passes through it, so that its bottom is near the ground.

Just in front of box C there is a revolving brush, D, turning on bearings on frame A. The brush is set either parallel with the axis or spirally around the stock, as is found most efficient. This brush is revolved by a spur-wheel, $a$, on the driving-wheel B, gearing into a pinion, $c$, on the brush-shaft, on which there is also a zigzag face cam, $d$, for vibrating the cutter-bar of the mower.

The supports $f$ of the finger-bar are adjustable with the frame A, to which they are bolted, and sustain the finger-bar (formed in any convenient and ordinary way) at a proper elevation, governed by small wheels $w$, one at each end. A lever, $l$, unites the cutter-bar with the cam $d$, by which it is vibrated.

The brush D is inclosed above and down in front by a curved cover, $e$, extending down near the ground behind the cutter, and thence up to the top of the box C, which it incloses. The front of box C extends upward behind the brush D to about the height of its axis, the upper edge turning outward toward the brush, thus forming a curved lip to catch the grass, &c., swept up by the brush and throw it into the box. The brush carries up the grass, &c., between it and the front cover or shield, $e$, as it is mowed by the cutter in front.

If this machine is to be used simply to sweep the lawn, the cutter is removed, and it then becomes a sweeper alone. This change can be easily made, and is very important in brushing leaves, &c., from lawns and grounds in autumn.

It is obvious that other methods of vibrating the cutter-bar may be substituted for the one here shown, and modifications of the frame and other parts may be made without affecting the character of my improvement.

Having thus fully described my lawn mower and sweeper, I claim—

1. In a lawn-mower, the combination of the cutters, the brush, the brush-shaft, and intermediate operating devices, whereby the cutters are vibrated by the revolution of the brush-shaft, substantially as and for the purposes set forth.

2. In a lawn-mower, the combination of the cutters, the brush, and the box C, having the curved lip, and provided with the cover $e$, as and for the purposes set forth.

In witness whereof I have hereto set my hand.

HENRY LACASSE.

In presence of—
P. L. SYLVESTER,
JOSEPH SMITH.